H. M. LANG
E. R. JENNINGS
G. C. HOWARD
L. B. WILDER
INVENTORS.

ATTORNEY.

3,202,562
METHOD OF INSTALLING A LINER IN A COUPLE-JOINTED CONDUIT
Harold M. Lang, Earl R. Jennings, George C. Howard, and Lawrence B. Wilder, Tulsa, Okla., assignors to Pan American Petroleum Corporation, Tulsa, Okla., a corporation of Delaware
Filed Nov. 15, 1961, Ser. No. 152,386
2 Claims. (Cl. 156—294)

The present invention relates to the installation of liners for conduits. More particularly, it is concerned with a method for placing a thin flexible liner in a conduit or pipe over a layer of a suitable thixotropic or similar material in a way such that the liner does not burst when subjected to high pressure, i.e., pressure in excess of 100 p.s.i.

The method contemplated for installing a flexible liner in a pipe or line is similar to that described in U.S. 2,794,758. The procedure there described involves the in-place lining of a pipeline, or similar conduit, with a tubular plastic liner which is initially mounted on a reel. The free end of the liner is anchored to the end of the pipeline and then by fluid pressure exerted on the exterior of said liner at the anchored end thereof the liner is forced to pass through itself, i.e., is turned inside-out, and is paid off of the reel until half the length of the conduit is lined. At that point, the liner is severed at the supply reel, the free end of the liner is tied closed, and the remainder of the liner is then installed. When the liner is severed from the supply reel, the free end of the liner may be tied closed with a string which is then paid out from a string supply reel in order to provide a controlled tension to the liner as the last half of the conduit is lined. When the liner has reached the second end of the conduit and is anchored by any of a number of known methods, the string is withdrawn from the lined conduit.

The difficulty frequently encountered when employing a pressured system in which the lining has been installed by the above patented method is that the liner ruptures as a result of cuts made by pressure of the liner against pipe coupling threads. Also, some bursting of the liners has been experienced in spaces of enlarged diameter between pipe ends at the coupled connections. A further contributing factor to this difficulty is the sharp ends of the pipe at the coupled joints which tend to cut the liner when the system is placed under pressure. Of course, a leak of any kind in the flexible liner allows the transported fluid to flow between the liner and the pipe resulting in failure of the entire installation. An additional problem occurs in the case of old pipe or with pipe that has been welded at the joints. In many cases, used pipe has numerous depressions, corrosion pits, etc., which are often deep enough to cause a thin film to expand into the depression or pit and burst when the line is placed under substantial internal pressure. Likewise, the liner can be pierced by coming into contact at elevated pressure with jagged pieces of metal, welding flux and the like.

Current methods of installing a liner of the type concerned involve application of an adhesive to the interior wall of the pipe. This material is usually applied in a known manner to the pipe wall by the use of "pigs" leaving a thin film on the interior. The adhesive, being heavily diluted or cut with gasoline, has a very low viscosity and tends to run or settle to the bottom of the pipe leaving void spaces between pipe ends at coupling connections with a diameter—for example, in the case of 2" pipe—of about ¼ inch larger than the normal I.D. of the pipe. This difference in radius alone can easily cause the liner to burst under pressure even if the ends of the pipe on either side of the void are not sharp. Furthermore, the thin adhesive fails to cover satisfactorily the aforesaid pieces of metal and welding flux or deep depressions in the pipe wall, thereby increasing the possibility of the liner bursting when forced into contact with such non-uniformities under high pressure.

In the drawings, FIGURE 1 is a sectional view illustrating one method of placing a thixotropic substance on the interior walls of a pipe.

Figure 1:
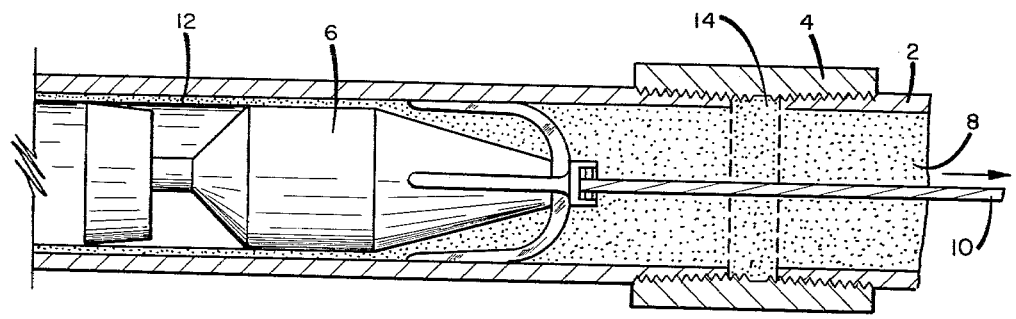
Figure 2:
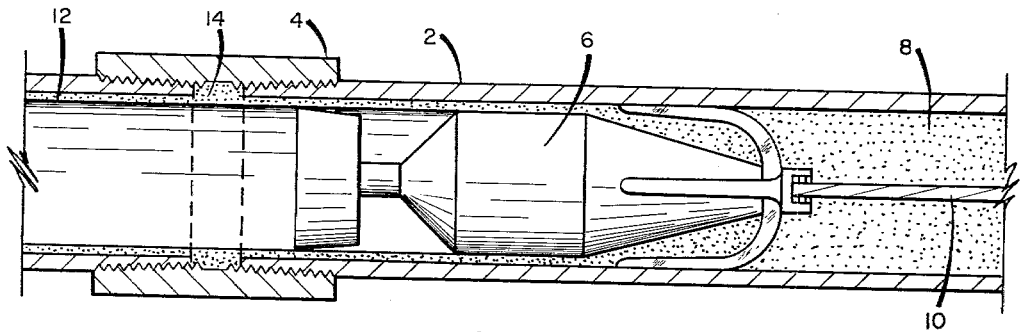
FIGURE 2 is a fragmentary view of a pipe in section showing how the void between the ends of pipe has been filled in and its diameter made equal to the I.D. of the pipe.
Figure 3:
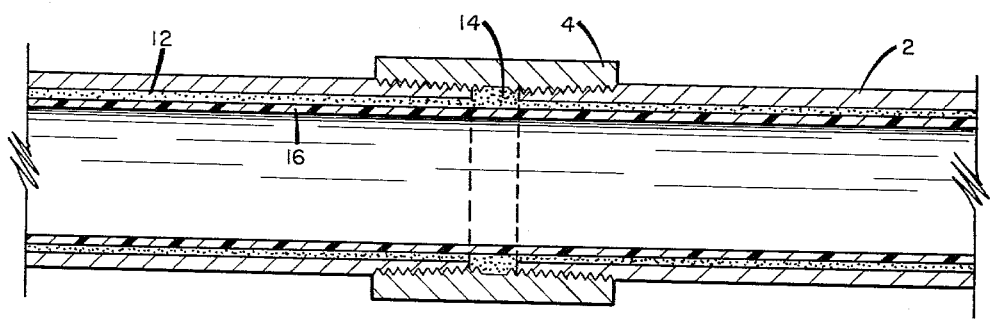
FIGURE 3 is also a sectional fragmentary view showing a flexible plastic liner installed in the pipe and fully supported at the aforesaid void by a fill of grease or similar material.

Referring now to the drawings, sections of a pipeline 2 are joined by a threaded coupling 4. A pig or applicator 6 is pulled through a mass of heavy grease 8 by means of cable 10 to form a thick, e.g., a $\frac{1}{32}$" film or layer 12. As the applicator is drawn from left to right and as it passes the void 14, it forces grease into said void filling it and causing the surface of the fill at that point to be flush with the new inner layer 12. When applicator 6 has been pulled the entire distance through the line, a uniform layer of adhesive filling all voids and covering objectionable metal projections has been produced. Thereafter, a plastic liner 16 is installed preferably in accordance with the procedure outlined in U.S. 2,794,758 mentioned above. As shown in FIGURE 3, the void caused by coupling the pipe ends is completely filled with grease thereby preventing the liner from deforming and bursting when pressure is applied to the system.

In a system of the type described immediately above we have circulated water at the rate of 1200 bbl./day and at 100 p.s.i. without damage to the liner or other malfunction. Actually, we have found that a liner 2 mils in thickness when installed in accordance with our invention has withstood pressures as high as 1700 p.s.i. without bursting. In this connection we found no enlargement at the point directly over the coupling joint thereby eliminating the bursting problem and avoiding contact between the film or liner and the sharp edges of the pipe ends which in the past had been responsible for the cutting and puncturing problem. On the other hand, when liners were installed in the same pipe and the voids in the system unfilled or improperly filled, the liners ruptured at pressures as low as 25 p.s.i.

Types of liners employed may vary widely in both composition and thickness. In addition to the types of fluid to be carried, the diameter of the pipe to be lined will also to some extent determine the nature of the liner used. For example, certain liners withstand more flexing than others and hence can be used in smaller diameter lines where this characteristic is more important than in the case of larger diameter lines. Generally speaking, liners made of Saran, a vinylchloride—vinylidene chloride copolymer, and Teflon, a tetrafluoroethylene polymer, are ordinarily satisfactory. Films of certain polyesters, polyethylene and the like may also be employed.

Film thickness also is a factor, controlled to some extent by the diameter of the pipe, with the thinner more flexible liners being needed in the case of the smaller diameter pipe. Usually, film thicknesses of from about 1 to about 5 mils are adequate. The thixotropic material may be any of a number of substances such as automotive chassis greases, for example, those prepared from precipitated metallic soaps. In case the particular line involved may be exposed to high temperatures, e.g., 100°–115° C., high melting point lubricants made for such conditions can be used. Typical of such greases are those made with aluminum soaps as described in U.S. 2,343,736; greases prepared from lithium and barium soaps in accordance with U.S. 2,403,104, and calcium soap greases produced as described in U.S. 2,399,063. There are many other high temperature and/or high melting point greases available that are suitable as an adhesive for use in our invention. In addition to this class of materials, bituminous compounds such as coal tar or asphalt emulsion pastes of grease-like consistency may also be employed with good results. Usually, the adhesive should be spread on the interior of the pipe in layers ranging in thickness from about 1/64 to about 1/16 inch. Deposits or layers of adhesives of the aforesaid type show no tendency to run or sag out when subjected to a wide range of operating conditions.

From the foregoing description it will be apparent that our invention has made available a number of very practical advantages. Thus, we have eliminated the use of comparatively expensive adhesives since our tests have shown that sufficient contact adhesion is provided by compositions of the aforesaid type. Such compositions also serve as a secondary corrosion preventative, particularly if an oil-soluble inhibitor is added. The adhesives we employ are easily removed from the line and are harmless to the liner. If desired, a hard plant seed flour, such as walnut shell flour, may be added to said composition to shut off thread leaks existing at couplings and help prevent future occurrence of such leaks. Ordinarily this material may be added to the thixotropic substance in a concentration corresponding to from about 10 to about 50 percent by weight, based on the weight of said substance.

We claim:

1. A method for preventing the rupture of a thin, collapsible film liner when the latter is placed in a couple-jointed conduit having objectionable irregularities on the inner surface thereof and subjected to elevated pressures, which comprises spreading over said surface a thin layer of a thixotropic substance of grease-like consistency, said layer having a substantially uniform surface whereby said irregularities are covered, thereafter placing said liner in the resulting interiorly coated conduit, and forcing the walls of said liner into substantially complete and continuous contact with said layer.

2. A method for preventing the rupture of a thin, collapsible film liner when the latter is placed in a couple-jointed conduit having objectionable irregularities on the inner surface thereof and subjected to elevated pressures, which comprises spreading over said surface a thin layer of a thixotropic substance of grease-like consistency, said layer having a substantially uniform surface whereby said irregularities are covered, said thixotropic substance being selected from a class consisting of a lithium soap grease, an aluminum soap grease, a calcium soap grease, a bituminous emulsion paste and a thixotropic substance to which from about 10 to about 50 percent by weight of a finely divided plant seed material has been added, thereafter placing said liner in the resulting interiorly coated conduit, and forcing the walls of said liner into substantially complete and continuous contact with said layer.

References Cited by the Examiner

UNITED STATES PATENTS

| | | | |
|---|---|---|---|
| 2,343,225 | 2/44 | Pray et al. | 156—294 XR |
| 2,410,681 | 11/46 | Rayburn | 156—293 XR |
| 2,417,881 | 3/47 | Munger | 156—294 XR |
| 2,446,243 | 8/48 | Reynolds | 156—293 XR |
| 2,876,154 | 3/59 | Usab | 156—294 XR |
| 3,080,269 | 3/63 | Pollock et al. | 156—294 XR |

FOREIGN PATENTS 322,834 12/29 Great Birtain.

EARL M. BERGERT, *Primary Examiner.*